(12) United States Patent
Lewis

(10) Patent No.: US 7,002,609 B2
(45) Date of Patent: Feb. 21, 2006

(54) NANO-STRUCTURE BASED SYSTEM AND METHOD FOR CHARGING A PHOTOCONDUCTIVE SURFACE

(75) Inventor: Howard Lewis, Memphis, TN (US)

(73) Assignee: Brother International Corporation, NJ (US)

( * ) Notice: Subject to any disclaimer, the term of this patent is extended or adjusted under 35 U.S.C. 154(b) by 630 days.

(21) Appl. No.: 10/289,939

(22) Filed: Nov. 7, 2002

(65) Prior Publication Data

US 2004/0091285 A1    May 13, 2004

(51) Int. Cl.
*B41J 2/435* (2006.01)
*B41J 2/447* (2006.01)
*G03G 13/05* (2006.01)

(52) U.S. Cl. .................. 347/129; 347/238; 430/31
(58) Field of Classification Search ............. 347/129, 347/238
See application file for complete search history.

(56) References Cited

U.S. PATENT DOCUMENTS

| | | | |
|---|---|---|---|
| 3,683,212 A | 8/1972 | Zoltan | |
| 3,747,120 A | 7/1973 | Stemme | |
| 4,126,868 A | 11/1978 | Kirner | |
| 4,216,483 A | 8/1980 | Kyser et al. | |
| 5,527,651 A | 6/1996 | Hodson | |
| 5,604,522 A | 2/1997 | Miura et al. | |
| 5,772,905 A | 6/1998 | Chou | |
| 5,822,542 A | 10/1998 | Smith et al. | |
| 5,854,902 A | 12/1998 | Wilson et al. | |
| 5,903,804 A | 5/1999 | Kirkpatrick et al. | |
| 6,132,278 A | 10/2000 | Kang et al. | |
| 6,154,131 A | 11/2000 | Jones, II et al. | |
| 6,166,763 A | 12/2000 | Rhodes et al. | |
| 6,198,391 B1 | 3/2001 | DeVolpi | |
| 6,226,031 B1 | 5/2001 | Barraclough et al. | |
| 6,232,706 B1 | 5/2001 | Dai et al. | |
| 6,249,080 B1 * | 6/2001 | Komoda et al. | ............ 313/310 |
| 6,271,752 B1 | 8/2001 | Vaios | |
| 6,292,098 B1 | 9/2001 | Ebata et al. | |
| 6,309,580 B1 | 10/2001 | Chou | |
| 6,323,897 B1 | 11/2001 | Kogane et al. | |
| 6,392,692 B1 | 5/2002 | Monroe | |
| 6,400,265 B1 | 6/2002 | Saylor et al. | |
| 6,404,455 B1 | 6/2002 | Ito et al. | |
| 6,416,471 B1 | 7/2002 | Kumar et al. | |
| 6,422,077 B1 * | 7/2002 | Krauss et al. | ............ 73/514.25 |
| 6,424,370 B1 | 7/2002 | Courtney | |
| 6,445,006 B1 | 9/2002 | Brandes et al. | |
| 2003/0180640 A1 * | 9/2003 | Darty | .......................... 430/31 |

FOREIGN PATENT DOCUMENTS

EP        1 061 55 A1    12/2000
WO    WO 99/65821       12/1999

(Continued)

OTHER PUBLICATIONS

Ruben, et al., "Pulmonary Function and Metabolic Physiology of the Theropod Dinosaurs", Science. Jan. 22, 1999, vol. 283, pp. 14.

(Continued)

*Primary Examiner*—Huan Tran
(74) *Attorney, Agent, or Firm*—Reed Smith LLP

(57) ABSTRACT

A system for charging a photoconductive surface being suitable use in forming an image on a substrate, the system including: an at least partial vacuum chamber; at least one nanostructure being disposed within the vacuum chamber and suitable for emitting electrons; and, at least one cap disposed with respect to the at least one nanostructure such that electrons emitted from the at least one nanostructure and colliding with the cap cause radiation suitable for charging the photoconductive surface.

80 Claims, 2 Drawing Sheets

FOREIGN PATENT DOCUMENTS

WO     WO 0177694 A    10/2001
WO     WO 02/31857 A1    4/2002

OTHER PUBLICATIONS

Fan, et al., "Self-Oriented Regular Arrays of Carbon Nanotubes and Their Field Emission Properties", Science, Jan. 22, 1999, vol. 283, pp. 512-513.

Yue, et al., "Generation of Continuous and Pulsed Diagnostic Imaging X-ray Radition Using a Carbon-nantube-based Field-emission Cathode", Appl. Phys Lett., vol. 81, No. 2, Jul. 8, 2002, pp. 355, 356, and 357.

XP-002274470—Abstract—CN 1 153 397 A—Broadcasting SCI Inst. Ministry, Jul. 2, 1997.

* cited by examiner

NANO-STRUCTURE BASED SYSTEM AND METHOD FOR CHARGING A PHOTOCONDUCTIVE SURFACE

FIELD OF THE INVENTION

The present invention relates generally to photoconductive devices, and more particularly to systems and methods for charging photoconductive surfaces.

BACKGROUND OF THE INVENTION

The usefulness of photoconductive devices is well understood by those possessing an ordinary skill in the pertinent arts. For example, photoconductive surfaces may be used to create images by xerography. Typical devices that employ xerography include commercially available photocopiers, laser printers and facsimile machines, for example. Photoconductive devices use photoconductive materials whose operational characteristics, such as electrical conductivity, is affected by exposure to electromagnetic radiation, such as light. One example of such a photoconductive material is an organic photosensitive material, such as polycarbonate dissipated with optically conductive resin.

Generally, a photoconductive device, such as a laser based printer or facsimile machine, uses a Light Amplification by Stimulated Emission of Radiation (LASER) device to illuminate select portions of a photoconductive surface, commonly referred to as a drum, in such a way as to be representing an image to be produced. Such illumination may be effected by scanning the laser device across the imaging surface of the drum. Alternatively, for example, the drum may be illuminated using an array of Light Emitting Diode (LED) devices. Regardless, select portions of the drum corresponding to areas to be imaged are conventionally illuminated, within the visible spectrum, for example.

Electrical charge on the illuminated portions of the drum are effected, e.g., charged, as is well understood by those possessing an ordinary skill in the pertinent arts, as compared to non-illuminated portions of the drum, for example—thus creating an electrostatic latent image on the drum surface. The drum may then be rolled through a reservoir of toner such that toner adheres, via electrostatic adhesion for example, to those portions of the drum that have been charged. The adhering toner may then be transferred to a substrate, such as a sheet of paper, using conventional methodologies—by applying heat and pressure to the toner and/or substrate for example, thus producing desired images on the substrate.

There are, however, many problems with conventional photoconductive devices. In particular, conventional devices are costly to manufacture. Thus, there currently is a need to make photoconductive devices cheaper to manufacture by, for example, eliminating a number of parts that are commonly required. Conventional photoconductive devices also have limitations in terms of imaging speeds. As such, it is similarly desirable to increase the imaging speed of such devices. Lastly, conventional photoconductive devices can be large and bulky. Therefore, photoconductive devices which are reduced in size are desirable as well.

SUMMARY OF THE INVENTION

A system and method are disclosed herein to solve the problems described above. In particular, a system and method are disclosed herein which charge a photoconductive surface that may be used in forming an image on a substrate.

According to an aspect of the present invention, a system is disclosed which includes at least a partial vacuum chamber; at least one nanostructure being disposed within the vacuum chamber and suitable for emitting electrons; and, at least one cap disposed with respect to the at least one nanostructure such that electrons emitted from the at least one nanostructure and colliding with the cap cause radiation suitable for charging at least one portion of the photoconductive surface.

According to an aspect of the invention, a method for charging a photoconductive surface that may be used in forming an image on a substrate is disclosed, where the method comprises receiving information being indicative of the image to be formed on the substrate; and, selectively inducing at least one of a plurality of nanostructures being disposed within a vacuum chamber to emit electrons that cause electromagnetic radiation to impinge upon the photoconductive surface thereby creating an electrostatic representation of the image to be formed on the substrate on the photoconductive surface depending upon the received information.

According to an aspect of the invention, a controller for charging a photoconductive surface being suitable for use in forming an image on a substrate is disclosed, the controller including a computer program product being embodied in a tangible medium, the computer program product including: code for receiving information being indicative of the image to be formed on the substrate; and, code for selectively inducing at least one of a plurality of nanostructures being disposed within a vacuum chamber to emit electrons that cause electromagnetic radiation to impinge upon the photoconductive surface thereby creating a latent electrostatic representation of the image to be formed on the substrate on the photoconductive surface depending upon the received information.

According to an aspect of the invention, a system for forming an image on a substrate is disclosed, the system comprising: at least one photoconductive surface; an at least partial vacuum chamber; at least one nanostructure being disposed within the vacuum chamber and suitable for emitting electrons; and, at least one cap disposed with respect to the at least one nanostructure such that electrons emitted from the at least one nanostructure and colliding with the cap cause radiation suitable for charging at least one portion of the photoconductive surface with a latent electrostatic image of the image to be formed on the substrate.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts, and.

DETAILED DESCRIPTION OF THE INVENTION

Figure 1:
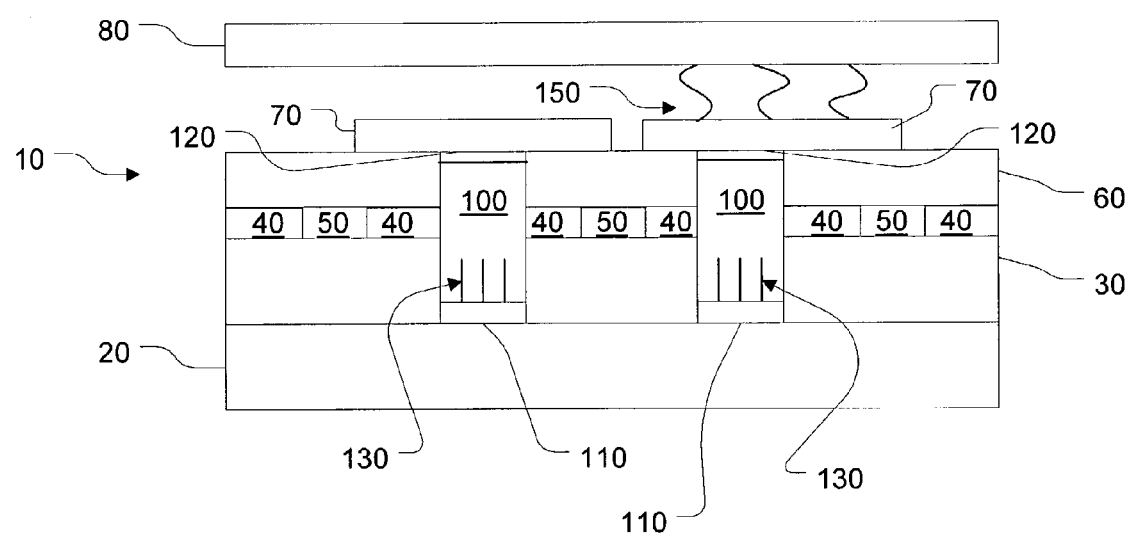
FIG. 1 illustrates a representative cross-sectional view of a system according to an aspect of the present invention; and, FIG. 2 illustrates a block-diagrammatic view of a system according to an aspect of the present invention.

Referring now to the Figures, wherein like references refer to like elements, FIG. 1 illustrates a representative cross-sectional view of a system 10 according to an aspect of the present invention. System 10 generally includes substrate 20, insulator 30, gate electrodes 40, insulators 50, insulator 60, and caps 70. Substrate 20, insulators 30, 60, electrodes 40 and caps 70, generally form a plurality chambers 100. FIG. 1 illustrates two (2) chambers 100, although any suitable number may be effectively utilized as will be evident to those possessing an ordinary skill in the pertinent arts.

Generally, one or more nanostructures 130, such as carbon based nanotubes, may be used as electron emitters. Nanostructures 130 may be positioned within one or more vacuum chambers, or tubes, 100. Upon application of a bias voltage, nanostructures 130 may emit electrons that strike plate, or cap, 70, at a distal, or substantially distal end of the one or more cavities, or tubes, 100. Of course, such a plate or cap may be positioned at any position relative to nanostructures 130 such that electrons emitted therefrom collide therewith to cause the emission of radiation as is set forth in more detail below. When the emitted electrons collide with the plate, or cap, 70 electromagnetic radiation 150 associated with the initial energy of the colliding electrons may be emitted as is well understood in the pertinent arts. This radiation 150 may be collated and directed towards a photoconductive surface 80 to be charged, creating a flow of charge in the area of the radiation but not in those portions that would conventionally remain non-illuminated. Thus, from a printing operation standpoint, once the photoconductive surface 80, such as a surface of an imaging drum, is charged, processing may be analogous to that used for conventional xerography, for example.

Substrate 20 may take the form of Si or amorphous silicon (α-Si) or a ceramic material, for example. Insulators 30, 50, 60 may be substantially distinct or unified, and formed of amorphous silicon dioxide (α-SiO$_2$), for example. Gate electrodes 40, may be formed of copper, or other suitable conducting material, for example. Upper plates, or caps, 70 may be formed of copper or glass, for example.

Chambers 100 may take the form of a pattern or array. The array may be rectangular in shape. Each chamber 100 may define a vacuum chamber or tube. Distal, or substantially distal, ends of each chamber 100 may have a cathode 110 and anode 120 respectively formed thereat. In general, anode 120 may take the form of any positively charged electrode suitable for accelerating electrons emitted from nanostructures 130 towards cap 70. Cap 70 and anode 120 may be realized as a single structure, or as separate structures. Anode 120 may take the form of a conventional mesh anode, for example. Anode 120 may take the form of one or more conventional gating electrodes, for example. In general, cathode 120 may take the form of any positively charged electrode, such as a plate of conductive material like copper or iron for example.

Nanostructures 130 are suitable for emitting electrons towards cap 70 responsively to activation of cathode 110, anode 120 and corresponding ones of gate electrodes 40. One or more nanostructures 130, such as carbon-based nanotubes, may be formed or deposited on, or otherwise operatively coupled to each cathode 110. Carbon nanotubes are a variant of crystalline carbon, and are structurally related to cagelike, hollow molecules composed of hexagonal and pentagonal groups of carbon atoms, or carbon fullerene "buckyballs", or $C_{60}$. It should be understood though that while carbon fullerenes and nanotubes have many common features, there are differences in both structure and properties. Single-wall carbon nanotubes may have diameters of 1.2 to 1.4 nm, for example, with lengths of approximately 10 μm, for example. It should be understood however, that any nanostructure, or group of nanostructures (being either homogenous or heterogeneous in nature), such as multi-wall carbon nanotubes or arrays of single- and multi-wall carbon nanotubes, being suitable for emitting electrons so as to collide with cap 70 may be used though.

Nanostructures 130 may include one or more films containing carbon nanotubes, including single-wall carbon nanotubes for example. The manufacture of such films is understood by those possessing an ordinary skill in the pertinent arts. For example, such a film may be produced in accordance with the teachings of Jean-Marc Bonard et. al. in "Field Emission From Single-Wall Carbon Nanotube Films". *Applied Physics Letters,* vol. 73, No. 7, Aug. 17, 1998. Briefly, Bonard et. al. teach that single-wall carbon nanotubes may be produced using arc discharge under a 500 mbar static pressure, and a graphite cathode (20 mm) and anode (5 mm). A 3 mm aperture through the anode may be filled with a graphite-Ni—Y mixture having a weight proportion of 2:1:1. A voltage of 25 V (100 A) may then be applied, producing webs of nanotubes. These webs may be sonicated in a sodium dodecyl sulfate at 2 critical micellular concentration. The resulting suspension may the be drawn through a 0.2 μm pore ceramic filter to produce a film, that may be transferred to a Teflon coated copper or brass plate. This plate/film composite structure may be utilized as nanostructures 130 and cathode 110.

Nanostructures 130 may include one or more self-oriented regular arrays of carbon nanotubes. The production of such arrays is understood in the pertinent arts. For example, such an array may be formed in accordance with the teachings of Shoushan Fan et al. in "Self-Oriented Regular Arrays of Carbon Nanotubes and Their Field Emission Properties". *Science,* pp. 512–514, Vol. 283, Jan. 22, 1999. Briefly, Fan et al. teach that a P-doped, N+-type Si(100) wafer may be electrochemically etched using one part (50% aqueous solution) hydrogen fluoride and one part ethanol at 10 mA/cm$^2$ and a Pt cathode to form a porous silicon substrate. This substrate may be patterned using Fe films and electron beam evaporation through shadow masks. The patterned substrate may then be annealed at 300° C., so as to oxidize the surface of the exposed silicon and iron. The annealed substrate may then be heated to 700° C. in Ar. Ethylene flown at 1000 sccm for 15 to 60 min., forming three dimensional arrays of nanotubes corresponding to the patterned portions of the substrate. The substrate/nanotube composite structure may be utilized as nanostructures 130 and cathode 110.

Referring still to FIG. 1, a non-limiting, exemplary operation of system 10 will be described. In general, according to an aspect of the present invention, high voltages accelerate electrons emitted from nanostructures 130 toward the upper plates or caps 70. As these electrons collide with a pad 120, energy may be released in the form of electromagnetic radiation 150, such as mostly low wavelength (ultraviolet) radiation. Radiation 150 may illuminate corresponding portions of photoconductive surface 80, which may take the form of an imaging drum as has been set forth. These illuminated portions of surface 80 may then be used to transfer toner to a substrate as is conventionally understood. Ultraviolet, as used herein, generally refers to the range of invisible electromagnet radiation having wavelengths from about 4 nm to about 380 nm. Of course, electromagnetic radiation of other wavelengths may be effectively used, provided it effects the desired charge on the photoconductive surface.

According to an aspect of the present invention, cathode 110 and anode 120 may be activated by providing a suitable voltage there-across, such as 200 V. Gate electrodes 40 may be used to selectively cause electrons to be emitted from nanostructures 130 and accelerated towards anode 120 and plate 70 as is conventionally understood, such as by selectively activating gate electrodes 40 using 100 V. As will be understood by those possessing an ordinary skill in the pertinent arts, the gate electrode 40 to cathode 110 voltage is generally applied to establish a field potential between a distal tip of nanostructures 130 and gate electrode 40, which may be expressed in volts/meter, for example. Nanostructures 130 will emit once the established field potential exceeds a certain threshold. As will be readily understood in the pertinent arts, the actual gate 40 to nanostructure 130 bias voltage and working distance is a matter of design choice. Turn on field potentials above about 1.5 million volts/meter (1.5 volt/micrometer) may be suitable for causing field emission from nanostructures 130. Therefore, for a gate to cathode tip distance of about 50 micron, an approximately 75 V bias may be applied. Additional biasing may also be included, better to insure field emission is operating in the saturation region of the emission curve, for example.

As emitted electrons collide with a pad 120, energy may be released in the form of electromagnetic radiation 150, such as mostly low wavelength (ultraviolet) radiation. Radiation 150 may illuminate corresponding portions of photoconductive surface 80, which may take the form of an imaging drum as has been set forth. These illuminated portions of surface 80 may then be used to transfer toner to a substrate as is conventionally understood. In other words, an electrostatic representation of the desired image to be formed on the substrate may be created on photoconductive surface 80 using radiation 150. Of course, the image of the representation may be inverted with respect to the desired image to be formed on a substrate as is conventionally understood, for example. In this case, the inversion is typically a mirror inversion rather than a negaitive image.

Figure 2:
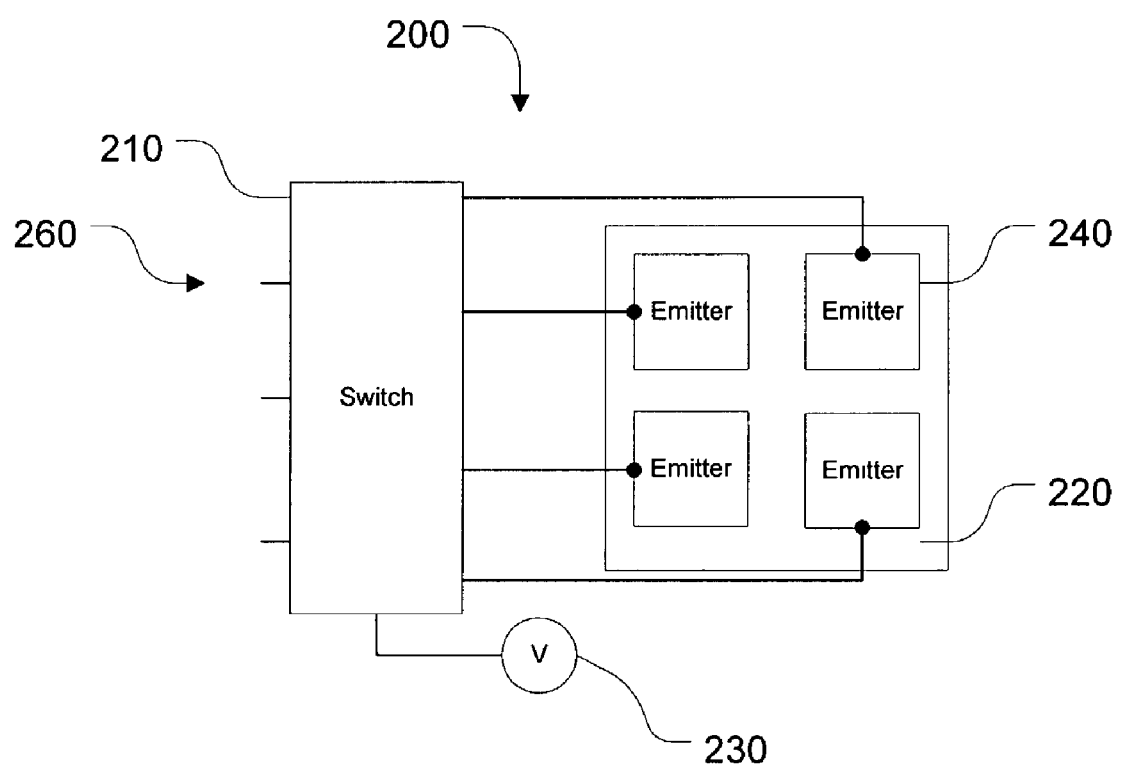

Referring now also to FIG. 2, there is shown a block-diagrammatic view of a system 200 according to an aspect of the present invention. Generally, system 200 includes switch 210, array 220 and power supply 230.

Array 220 includes a plurality of emitters 240. Each emitter 240 may correspond to one, or more than one, portion of the photoconductive surface to be charged, such as a pixel, or group of pixels, to be imaged on a substrate. Through the use of array 220, multiple portions of a photoconductive surface corresponding to pixels, or groups of pixels, to be imaged on the substrate may thus be simultaneously, or substantially simultaneously, charged. Each emitter 240 may take the form of a cavity 100 (FIG. 1), or group of cavities 100 (FIG. 1). Switch 210 may take any suitable form for driving operation of array 220. For example, switch 210 may take the form of suitable hardware, software, suitable microprocessor based device, Application Specific Integrated Circuit (ASIC) and/or combination thereof operatively coupled to emitters 240 so as to cause operation thereof. By way of non-limiting example, switch 210 may take the form of an ASIC including at least one output coupled to emitters 240, a suitable microprocessor and at least one tangible memory device accessible by the microprocessor. The memory device may be internal or external to the microprocessor. The memory device may include a plurality of instructions, or code, which when accessed and processed by the microprocessor causes selective operation of emitters 240.

By way of further, non-limiting example, where an emitter 240 takes the form of a cavity 100 (FIG. 1), switch 210 may be interconnected between power supply 230 and cathode 110, gate electrode 40 and anode 120 (FIG. 1) to cause selective emission and acceleration of electrons from nanostructures 130 (FIG. 1) thereby charging at least one corresponding portion of photoconductive surface 80 as has been set forth. Switch 210 may be responsive to input signals received on inputs and/or inputs/outputs 260 being indicative of an image to be created on a substrate. Switch 210 may serve to address array 220 in a matrix fashion responsively to received information, as opposed to a scanning fashion as may otherwise be necessary with the use of a laser to illuminate the photoconductive surface, for example. Switch 210 may take the form of at least one controller operatively coupled to at least one of anode 120, cathode 110 and at least one gating electrode 40. Switch 210 may be suitable for receiving information being indicative of an image to be formed on a substrate and selectively causing at least emitter 240 to emit electrons responsively to the received information.

In other words, depending upon the received information, at least one of a plurality of nanostructures being disposed within a vacuum chamber, such as nanostructures 130 of FIG. 1, may be selectively activated, or induced, to emit electrons. These electrons will cause electromagnetic radiation, such as the radiation 150 of FIG. 1, to impinge upon the photoconductive surface, such as the surface 80 of FIG. 1. This will in turn create a latent electrostatic representation of the image to be formed on the substrate on the photoconductive surface.

As will further be understood by one possessing an ordinary skill in the pertinent arts, as an accelerating voltage causes electrons to move across a gap between nanostructures 130 and the cap 120, control of the accelerating potential will cause a corresponding variance in energy level when electrons impact cap 120. Accordingly, control of the wavelength of electromagnetic radiation impinging upon the photoconductive surface may be effected by controlling the gate to anode, or cathode to anode, voltage bias, for example. Thus, a variable wavelength apparatus may be realized using a fixed geometry, by achieving different energy bombardment of the cap.

It will be apparent to those skilled in the art that various modifications and variations may be made in the apparatus and process of the present invention without departing from the spirit or scope of the invention. For example, while the present invention as discussed above relates to charging a conventional photoconductive device imaging drum being suitable for use with conventional imaging toner. This discussion represents a non-limiting example of the invention for purposes of explanation only. Specifically, as will be understood by those possessing an ordinary skill in the pertinent arts, the present invention may be used with other photoconductive surfaces, such as planar surfaces—as opposed to substantially cylindrical surfaces, as well. Thus, it is intended that the present invention cover the modification and variations of this invention provided they come within the scope of the appended claims and their equivalents

What is claimed is:

1. A system for charging a photoconductive surface being suitable for use in forming an image on a substrate, said system comprising:
   an at least partial vacuum chamber;
   at least one nanostructure being disposed within said vacuum chamber and suitable for emitting electrons; and,
   at least one cap disposed with respect to said at least one nanostructure such that electrons emitted from said at least one nanostructure and colliding with said cap to emit radiation suitable for charging at least one portion of said photoconductive surface.

2. The system of claim 1, further comprising at least one cathode disposed within said chamber, wherein said at least one nanostructure is operatively coupled to said at least one cathode.

3. The system of claim 2, further comprising at least one anode being disposed with respect to said cathode and cap so as to accelerate electrons emitted from said at least one nanostructure towards said cap.

4. The system of claim 3, further comprising at least one gate electrode positioned with respect to said anode and cathode to control at least acceleration of said emitted electrons.

5. The system of claim 4, further comprising at least one substrate supporting said chamber, at least one nanostructure, cap, anode and cathode.

6. The system of claim 5, wherein said substrate comprises at least one of silicon material and amorphous silicon material.

7. The system of claim 6, wherein said at least one gate electrode comprises a conductive material.

8. The system of claim 7, further comprising at least one insulating material interposed between said anode and cathode.

9. The system of claim 8, wherein said insulating material at least partially defines said cavity.

10. The system of claim 8, wherein said insulating material comprises at least one of an amorphous silicon material and amorphous silicon dioxide material.

11. The system of claim 7, wherein said cap comprises at least one metallic material.

12. The system of claim 11, wherein said at least one metallic material comprises copper.

13. The system of claim 7, wherein said cap comprises at least one non-metallic material.

14. The system of claim 13, wherein said at least one non-metallic material comprises glass.

15. The system of claim 3, wherein said anode comprises a mesh anode.

16. The system of claim 3, wherein said anode comprises at least one anode gating electrode.

17. The system of claim 1, wherein said at least one nanostructure comprises at least one nanotube.

18. The system of claim 1, wherein said at least one nanostructure comprises a film including nanotubes.

19. The system of claim 1, wherein said at least one nanostructure comprises a plurality of vertically aligned carbon nanotubes.

20. The system of claim 1, wherein said at least one nanostructure comprises at least one array of nanotubes.

21. The system of claim 1, wherein said at least one nanostructure comprises at least one carbon single-wall nanotube.

22. The system of claim 1, wherein said at least one nanostructure comprises at least one array of carbon single-wall nanotubes.

23. The system of claim 1, wherein said at least one nanostructure comprises at least one regular array of nanotubes.

24. The system of claim 1, wherein said at least one nanostructure comprises at least one regular array of carbon single-wall nanotubes.

25. The system of claim 22, further comprising at least one controller operatively coupled to at least one of said anode, cathode and at least one gating electrode, and being suitable for receiving information being indicative of said image to be formed on said substrate and selectively causing said at least one nanostructure to emit said electrons responsively to said received information.

26. The system of claim 1, wherein said radiation comprises ultraviolet radiation.

27. A method for charging a photoconductive surface being suitable for use in forming an image on a substrate, the method comprising the steps of:
   receiving information being indicative of said image to be formed on said substrate; and,
   selectively inducing at least one of a plurality of nanostructures being disposed within a vacuum chamber to emit electrons that cause electromagnetic radiation to impinge upon said photoconductive surface thereby creating an electrostatic representation of said image to be formed on said substrate on said photoconductive surface depending upon said received information.

28. The method of claim 27, further comprising activating at least one cathode and anode so as to accelerate said electrons.

29. The method of claim 27, wherein said selective inducing comprises selectively activating at least one gating electrode.

30. The method of claim 27, wherein said emitted electrons collide with at least one cap to cause said electromagnetic radiation.

31. The method of claim 27, wherein said at least one nanostructure comprises at least one nanotube.

32. The method of claim 27, wherein said at least one nanostructure comprises a film including nanotubes.

33. The method of claim 27, wherein said at least one nanostructure comprises a plurality of vertically aligned carbon nanotubes.

34. The method of claim 27, wherein said at least one nanostructure comprises at least one array of nanotubes.

35. The method of claim 27, wherein said at least one nanostructure comprises at least one carbon single-wall nanotube.

36. The method of claim 27, wherein said at least one nanostructure comprises at least one array of carbon single-wall nanotubes.

37. The method of claim 27, wherein said at least one nanostructure comprises at least one regular array of nanotubes.

38. The method of claim 27, wherein said at least one nanostructure comprises at least one regular array of carbon single-wall nanotubes.

39. The method of claim 27, wherein said radiation comprises ultraviolet radiation.

40. A controller for charging a photoconductive surface being suitable for use in forming an image on a substrate, said controller comprising a computer program product being embodied in a tangible medium, said computer program product comprising:
   code for receiving information being indicative of said image to be formed on said substrate; and,
   code for selectively inducing at least one of a plurality of nanostructures being disposed within a vacuum chamber to emit electrons that cause electromagnetic radiation to impinge upon said photoconductive surface thereby creating an electrostatic representation of said image to be formed on said substrate on said photoconductive surface depending upon said received information.

41. The controller of claim 40, further comprising code for activating at least one cathode and anode so as to accelerate said electrons.

42. The controller of claim 40, wherein said selective inducing comprises selectively activating at least one gating electrode.

43. The controller of claim 40, wherein said emitted electrons collide with at least one cap to cause said electromagnetic radiation.

44. The controller of claim 40, wherein said at least one nanostructure comprises at least one nanotube.

45. The controller of claim 40, wherein said at least one nanostructure comprises a film including nanotubes.

46. The controller of claim 40, wherein said at least one nanostructure comprises a plurality of vertically aligned carbon nanotubes.

47. The controller of claim 40, wherein said at least one nanostructure comprises at least one array of nanotubes.

48. The controller of claim 40, wherein said at least one nanostructure comprises at least one carbon single-wall nanotube.

49. The controller of claim 40, wherein said at least one nanostructure comprises at least one array of carbon single-wall nanotubes.

50. The controller of claim 40, wherein said at least one nanostructure comprises at least one regular array of nanotubes.

51. The controller of claim 40, wherein said at least one nanostructure comprises at least one regular array of carbon single-wall nanotubes.

52. The controller of claim 40, wherein said radiation comprises ultraviolet radiation.

53. A system for forming an image on a substrate, said system comprising:
   at least one photoconductive surface;
   an at least partial vacuum chamber;
   at least one nanostructure being disposed within said vacuum chamber and suitable for emitting electrons; and,
   at least one cap disposed with respect to said at least one nanostructure such that electrons emitted from said at least one nanostructure and colliding with said cap cause radiation suitable for charging at least one portion of said photoconductive surface with an electrostatic image of said image to be formed on said substrate.

54. The system of claim 53, further comprising toner being suitable for adhering to said latent image and then transferred to said substrate.

55. The system of claim 53, further comprising at least one cathode disposed within said chamber, wherein said at least one nanostructure is operatively coupled to said at least one cathode.

56. The system of claim 55, further comprising at least one anode being disposed with respect to said cathode and cap so as to accelerate electrons emitted from said at least one nanostructure towards said cap.

57. The system of claim 55, wherein said cap is adapted to serve as an anode for accelerating electrons emitted from said at least one nanostructure.

58. The system of claim 56, further comprising at least one gate electrode positioned with respect to said anode and cathode to control at least acceleration of said emitted electrons.

59. The system of claim 58, further comprising at least one substrate supporting said chamber, at least one nanostructure, cap, anode and cathode.

60. The system of claim 59, wherein said substrate comprises at least one of silicon material and amorphous silicon material.

61. The system of claim 60, wherein said at least one gate electrode comprises a conductive material.

62. The system of claim 61, further comprising at least one insulating material interposed between said anode and cathode.

63. The system of claim 62, wherein said insulating material at least partially defines said cavity.

64. The system of claim 63, wherein said insulating material comprises at least one of an amorphous silicon material and amorphous silicon dioxide material.

65. The system of claim 59, wherein said cap comprises at least one metallic material.

66. The system of claim 65, wherein said at least one metallic material comprises copper.

67. The system of claim 59, wherein said cap comprises at least one non-metallic material.

68. The system of claim 67, wherein said at least one non-metallic material comprises glass.

69. The system of claim 59, wherein said anode comprises a mesh anode.

70. The system of claim 59, wherein said anode comprises at least one anode gating electrode.

71. The system of claim 53, wherein said at least one nanostructure comprises at least one nanotube.

72. The system of claim 53, wherein said at least one nanostructure comprises a film including nanotubes.

73. The system of claim 53, wherein said at least one nanostructure comprises a plurality of vertically aligned carbon nanotubes.

74. The system of claim 53, wherein said at least one nanostructure comprises at least one array of nanotubes.

75. The system of claim 53, wherein said at least one nanostructure comprises at least one carbon single-wall nanotube.

76. The system of claim 53, wherein said at least one nanostructure comprises at least one array of carbon single-wall nanotubes.

77. The system of claim 53, wherein said at least one nanostructure comprises at least one regular array of nanotubes.

78. The system of claim 53, wherein said at least one nanostructure comprises at least one regular array of carbon single-wall nanotubes.

79. The system of claim 53, further comprising at least one controller operatively coupled to at least one of said anode, cathode and at least one gating electrode, and being suitable for receiving information being indicative of said image to be formed on said substrate and selectively causing said at least one nanostructure to emit said electrons responsively to said received information.

80. The system of claim 53, wherein said radiation comprises ultraviolet radiation.

* * * * *